United States Patent
Meisborn

(10) Patent No.: US 8,061,320 B2
(45) Date of Patent: Nov. 22, 2011

(54) LIFT TRANSMITTING COMPONENT AND METHOD OF MANUFACTURING SUCH A COMPONENT

(75) Inventor: Marco Meisborn, Aisch (DE)

(73) Assignee: Schaeffler KG, Herzogenaurach (DE)

( * ) Notice: Subject to any disclaimer, the term of this patent is extended or adjusted under 35 U.S.C. 154(b) by 221 days.

(21) Appl. No.: 12/312,276

(22) PCT Filed: Oct. 24, 2007

(86) PCT No.: PCT/EP2007/061397
§ 371 (c)(1),
(2), (4) Date: May 1, 2009

(87) PCT Pub. No.: WO2008/058836
PCT Pub. Date: May 22, 2008

(65) Prior Publication Data
US 2009/0314236 A1   Dec. 24, 2009

(30) Foreign Application Priority Data
Nov. 18, 2006   (DE) .......................... 10 2006 054 406

(51) Int. Cl.
*F01L 1/14*   (2006.01)
(52) U.S. Cl. .................... 123/90.48; 123/90.52; 74/569; 348/548
(58) Field of Classification Search ............... 123/90.48, 123/90.52, 90.55; 74/567, 569; 384/548, 384/553
See application file for complete search history.

(56) References Cited

U.S. PATENT DOCUMENTS

| | | | |
|---|---|---|---|
| 4,628,874 A | 12/1986 | Barlow |
| 4,796,483 A | 1/1989 | Patel |
| 5,099,807 A | 3/1992 | Devine |
| 5,385,124 A | 1/1995 | Hillebrand |
| 5,809,956 A | 9/1998 | Regueiro |
| 5,816,207 A | 10/1998 | Kadokawa |
| 5,921,209 A | 7/1999 | Regueiro |

FOREIGN PATENT DOCUMENTS

| | | |
|---|---|---|
| DE | 1 207 721 | 2/1960 |
| DE | 43 24 835 A1 | 1/1995 |
| DE | 43 37 594 A1 | 5/1995 |
| DE | 196 12 969 A1 | 10/1997 |
| DE | 196 35 184 A1 | 3/1998 |
| DE | 198 16 020 A1 | 10/1999 |
| DE | 103 15 416 A1 | 1/2004 |
| DE | 10 2004 025 738 A1 | 5/2004 |
| EP | 0 363 161 | 10/1989 |
| FR | 614 387 | 9/1926 |

*Primary Examiner* — Ching Chang
(74) *Attorney, Agent, or Firm* — Charles A. Muserlian

(57) ABSTRACT

A lift transmitting component (1), particularly for a gas exchange valve train or a fuel pump drive of an internal combustion engine, and a method of manufacturing such a lift transmitting component comprising a housing (2) and a bearing pin (6) fixed in a reception bore (5) of the housing (2) as also a roller (4) rotatable about the bearing pin (6) and optionally mounted on a rolling bearing, said bearing pin (6) being connected to the housing (2) by positive engagement through radially widened front ends (8), the bearing pin (6) is core-hardened over its entire length with a core hardness of at least 58 HRC and its front ends (8) are widened by radial spot riveting.

5 Claims, 3 Drawing Sheets

LIFT TRANSMITTING COMPONENT AND METHOD OF MANUFACTURING SUCH A COMPONENT

This application is a 371 of PCT/EP2007/061397 filed Oct. 24, 2007.

FIELD OF THE INVENTION

The invention concerns a lift transmitting component, particularly for a gas exchange valve train or a fuel pump drive of an internal combustion engine, and the invention further concerns a method of making such a component. The lift transmitting component comprises a housing and a bearing pin fixed in a reception bore of the housing as also a roller rotatable about the bearing pin and optionally mounted on a rolling bearing, said bearing pin being connected to the housing by positive engagement through one or both front ends of the bearing pin that are radially widened relative to the reception bore of the housing.

BACKGROUND OF THE INVENTION

A lift transmitting component of the pre-cited type configured as a roller tappet for activating a tappet push rod of a gas exchange valve train of an internal combustion engine is known from the generic document U.S. Pat. No. 5,099,807. The roller tappet comprises a cam-activated roller, mounted through a rolling bearing on the bearing pin that is fixed with radially widened front ends both by positive engagement and by force-locking in a reception bore of the tappet housing. The radial deformation of the front ends is effected by gyratory calking and the calked material of the bearing pin is displaced as a circular ring into a chamfer at the opening of the reception bore.

An alternative manner of fixing the bearing pin in the housing is disclosed, for example, in the likewise generic document U.S. Pat. No. 4,628,874 that, in addition to a roller tappet, also discloses a lift transmitting component configured as a roller finger lever. In both cases, the bearing pin for the roller is fixed in the reception bore of the respective housing by the fact that the material of the front ends of the bearing pin is displaced by a calking method radially outwards into a circumferential undercut situated within the reception bore.

Undercuts of the aforesaid type are also proposed for a roller tappet disclosed in U.S. Pat. No. 5,385,124. However, these undercuts do not serve to receive calked material of the bearing pin but for the reception of circlips that serve as positively acting axial stops for the non-deformed front ends of a bearing pin that is float-mounted in the reception bore.

A common feature of all the lift transmitting components proposed in the cited documents is that, with the aim of achieving wear resistance, their bearing pins are hardened in the region of their roller raceways. But if a bearing pin is calked, it is imperative for its front ends to be adequately soft in view of the material flow that is concomitant with the calking process. Such a bearing pin with non-uniform hardness values along its length, however, can only be realized through complex and, thus, cost-intensive heat treating methods. A further drawback of bearing pins whose front ends have only a low hardness arises from the fact that their calked ends must be fixed in the reception bore not only by positive engagement but also by force-locking. The reason for this is that, in the case of a bearing pin that is not fixed by force-locking in the reception bore and comes into rotation by the friction forces of the rotating roller, the soft ends of the bearing pin would be subject to contact friction with the housing on their periphery and would suffer a loss of their axial securing function and thus shear off. A fixing of the bearing pin in the reception bore not only by positive engagement but also by force-locking can pose a problem in cases in which the housing of the lift transmitting component has to meet special shape requirements as is the case with the initially cited cylindrical roller tappets. As a rule, these roller tappets are mounted in their longitudinal guides with a lash of just a few micrometers, so that a deformation of the housing, generally configured with thin walls in the region of the roller, would lead to an impermissibly large non-circularity of the housing due to the radially widened reception bore resulting from the calking of the bearing pin.

As proposed in the cited document U.S. Pat. No. 5,385,124, it is certainly possible to circumvent this chain of drawbacks by using a completely core-hardened bearing pin deformed on its front ends, float-mounted in its reception bore and fixed axially through positive engagement by means of circlips. Nonetheless, even in this case, there still remains the cost-increasing extra expenditure for the circlips and their assembly as well as for making the undercuts in the housing for receiving the circlips.

OBJECTS OF THE INVENTION

It is therefore an object of the invention to provide an improved lift transmitting component of the pre-cited type with which the aforesaid drawbacks can be eliminated by implementation of simple measures. A further object is particularly to minimize production costs particularly those connected with the operationally reliable fixing of the bearing pin and also minimize the deformation of the housing resulting from the fixing of the bearing pin.

This and other objects and advantages of the invention will become obvious from the following detailed description.

SUMMARY OF THE INVENTION

The invention achieves the above objects by the fact that the bearing pin is core-hardened over an entire length with a core hardness of at least 58 HRC and the front ends of the bearing pin are widened by radial spot riveting. This method of riveting, known per se, is an essential basis of the invention because the front ends of the completely core-hardened bearing pin, despite their comparatively high brittleness, can still be radially widened by this forming method which will be discussed more closely in the description of examples of embodiment of the invention. On the one hand, the heat treatment of the completely core-hardened bearing pin is simple and inexpensive and the pin can be taken from extremely economically mass-manufactured rolling elements. On the other hand, such a bearing pin can be fixed in the reception bore solely or substantially by positive engagement without its radially widened ends being subjected to abrasion as a result of rotation of the bearing pin. Besides this, the complex realization of the undercuts in the reception bore proposed in the prior art for receiving the radially outward calked bearing pin material or circlips can be done without in favor of lower production costs.

According to a further proposal of the invention, the non-widened diameter of the bearing pin is smaller than the diameter of the reception bore. Because the bearing pin thus has radial lash and because it is fixed in the reception bore of the housing only by positive engagement, there is no radial force application on the reception bore, so that it is possible not only to guarantee a high stability of shape of the housing but also to do without a special fitting or surface quality of the reception bore in favor of lower production costs. Moreover, the radial lash permits an autorotation of the bearing pin relative to the reception bore to the benefit of a uniform surface loading in the region of the roller, so that safety from surface wear in the contact region between the bearing pin and the roller, including any rolling elements that may be used, is further improved.

As an alternative to the radial lash or additionally thereto, it can also be advantageous with a view to a further improvement of the stability of shape of the housing, to fix the bearing pin with axial lash in the reception bore. In this case, a deformation of the housing by reason of axially acting chucking forces between the front ends of the bearing pin can be prevented.

If, with a view to assuring a stability of shape of the housing, the bearing pin is fixed solely by positive engagement, it is particularly advantageous to configure the housing with a substantially cylindrical shape. In a first preferred form of embodiment of the invention with this feature, the lift transmitting component is a roller tappet for a gas exchange valve train with bottom camshaft. In a second preferred form of embodiment, the lift transmitting component may be configured as a pump tappet for a high pressure fuel pump.

However, the invention is not limited to the aforesaid type of tappets but covers all lift transmitting components of the initially mentioned type. This applies irrespective of whether the main motion of the lift transmitting component is straight-lined or pivoting as is the case, for instance, with a roller tappet for activating a gas exchange valve. In addition, by lift transmitting components within the meaning of the invention are also to be understood components that can effect variable lift transmission. Such components are, for example, switchable roller tappets as used in internal combustion engines with bottom camshafts for achieving a mechanically simple cylinder deactivation, or roller levers of endlessly variable gas exchange valve trains that convert a rigid cam lift into a continuously reduced gas exchange valve lift.

BRIEF DESCRIPTION OF THE DRAWINGS

Further features of the invention will become obvious from the following description and the drawings which show simplified representations of examples of embodiment of the invention. If not otherwise stated, identical or similar functional features are designated by identical reference numerals.

DETAILED DESCRIPTION OF THE DRAWINGS

Figure 1:
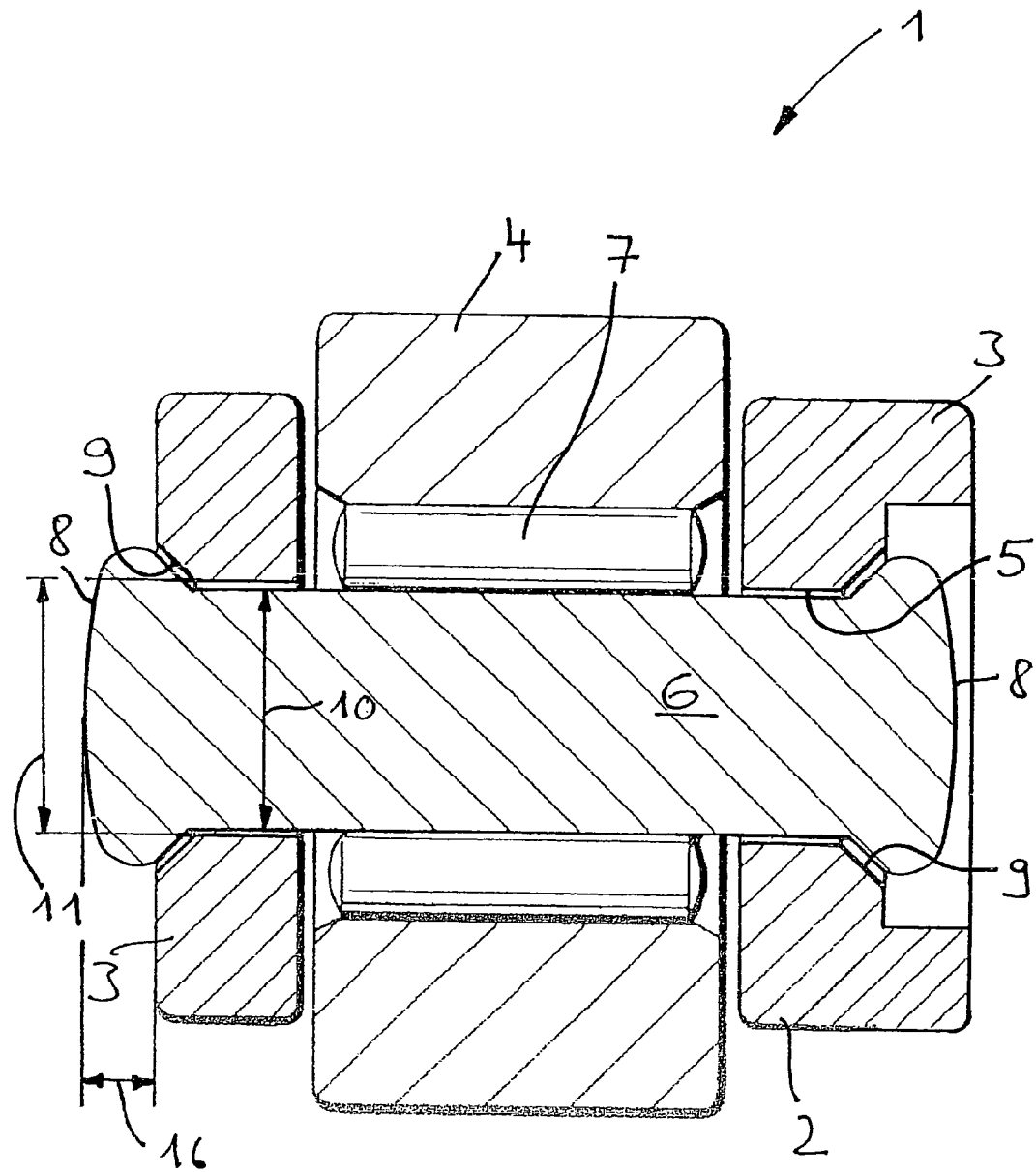
FIG. 1 shows a lift transmitting component of a general type in a cross-sectional view.

For a better understanding of the invention, FIG. 1 shows a cross-section of a lift transmitting component 1 of a general type. The lift transmitting component 1 comprises a housing 2 comprising spaced-apart side walls 3, a roller 4 arranged between the side walls 3 and activated by a lift applying element, not shown, a reception bore 5 extending through the side walls 3, and a bearing pin 6 fixed in the reception bore 5 for mounting the roller 4, in the present example by means of a needle roller bearing 7. In the present case, the bearing pin 6 is configured to act solely by positive engagement by the fact that front ends 8 of the bearing pin 6 are radially widened relative to the reception bore 5 and run on chamfers 9 arranged at openings of the reception bore 5. As clearly shown in FIG. 1, by the term "run on" is to be understood that the bearing pin 6 is fixed with perceptible axial lash in the reception bore 5. Because, in addition, the non-widened diameter 10 of the bearing pin 6 is smaller than the diameter 11 of the reception bore 5, a corresponding radial lash of the bearing pin 6 is formed, so that a force-locked connection of the bearing pin 6 to the housing 2 does not exist.

As an alternative to the above solution, however, it is also possible to fix the bearing pin 6 without axial lash and/or radial lash in the reception bore 5. In the case of the bearing pin 6 of the lift transmitting component 1 of FIG. 1 being fixed without axial lash, both front ends 8 of the bearing pin 6 configured with radial lash would bear simultaneously against the chamfers 9 of the reception bore 5. If the bearing pin 6 is fixed without radial lash, the bearing pin 6, except in the limiting case of a tight sliding fit, would be connected to the housing 2 not only by positive engagement but also by force-locking through an interference fit.

The bearing pin 6 made of a rolling bearing steel such as 100Cr6 is core-hardened over its entire length and possesses a Rockwell hardness HRC of at least 58 corresponding to a Vickers hardness of at least 650. Despite complete core hardening and the concomitant brittleness of the bearing pin 6, the front ends 8 of the bearing pin 6 are brought by radial spot riveting, substantially free of material spalling or cracking, into a lenticular shape with a convex spherical contour typical of this riveting method.

Figure 4:
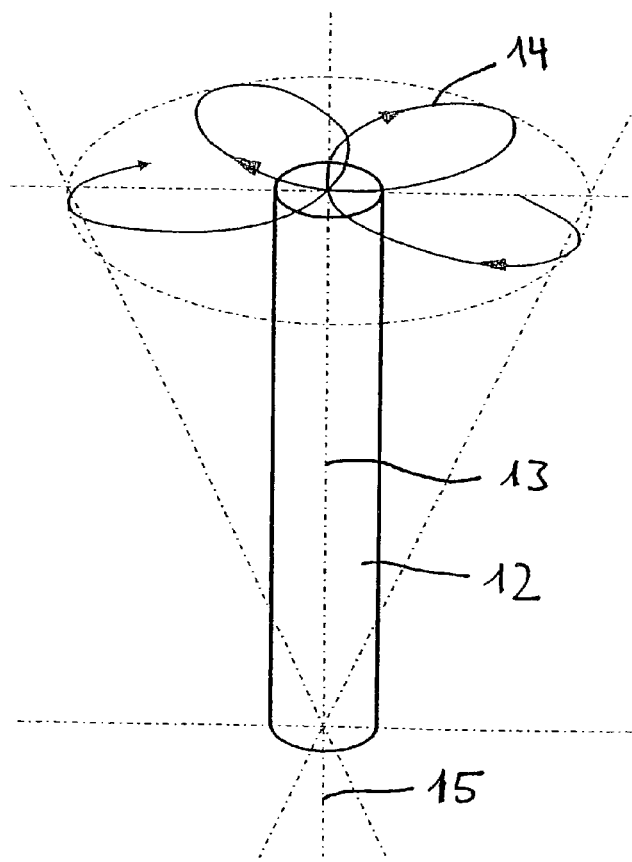
FIG. 4 is a schematic representation of a characteristic movement pattern of a radial spot riveting tool.

Consulting FIG. 4 will make it clear that this lenticular shape results from the spatial pattern of movement of a riveting die 12, made in the present case of a hard metal, of a radial spot riveting machine. In this pattern of movement, the longitudinal axis 13 of the riveting die 12 follows a cyclic loop line 14 whose envelope forms a circular cone tapering towards the work piece, i.e. towards the bearing pin 6. During this movement, the longitudinal axis 13 of the riveting die 12 repeatedly traverses the central axis 15 of the circular cone. Due to the high-load contact between the flat front end of the riveting die 12 and the front end 8 of the bearing pin 6, this front end 8 is successively deformed radially. In contrast to a calking method, an axial projection length 16 of the bearing pin 6 relative to the reception bore 5 is required in this case. But to still prevent the bearing pin 6 from projecting beyond the housing 2, as is the case at the left side wall 3 in FIG. 1, the opening of the reception bore 5 can have a stepped configuration corresponding to the right wall 3 of FIG. 1.

Figure 2:
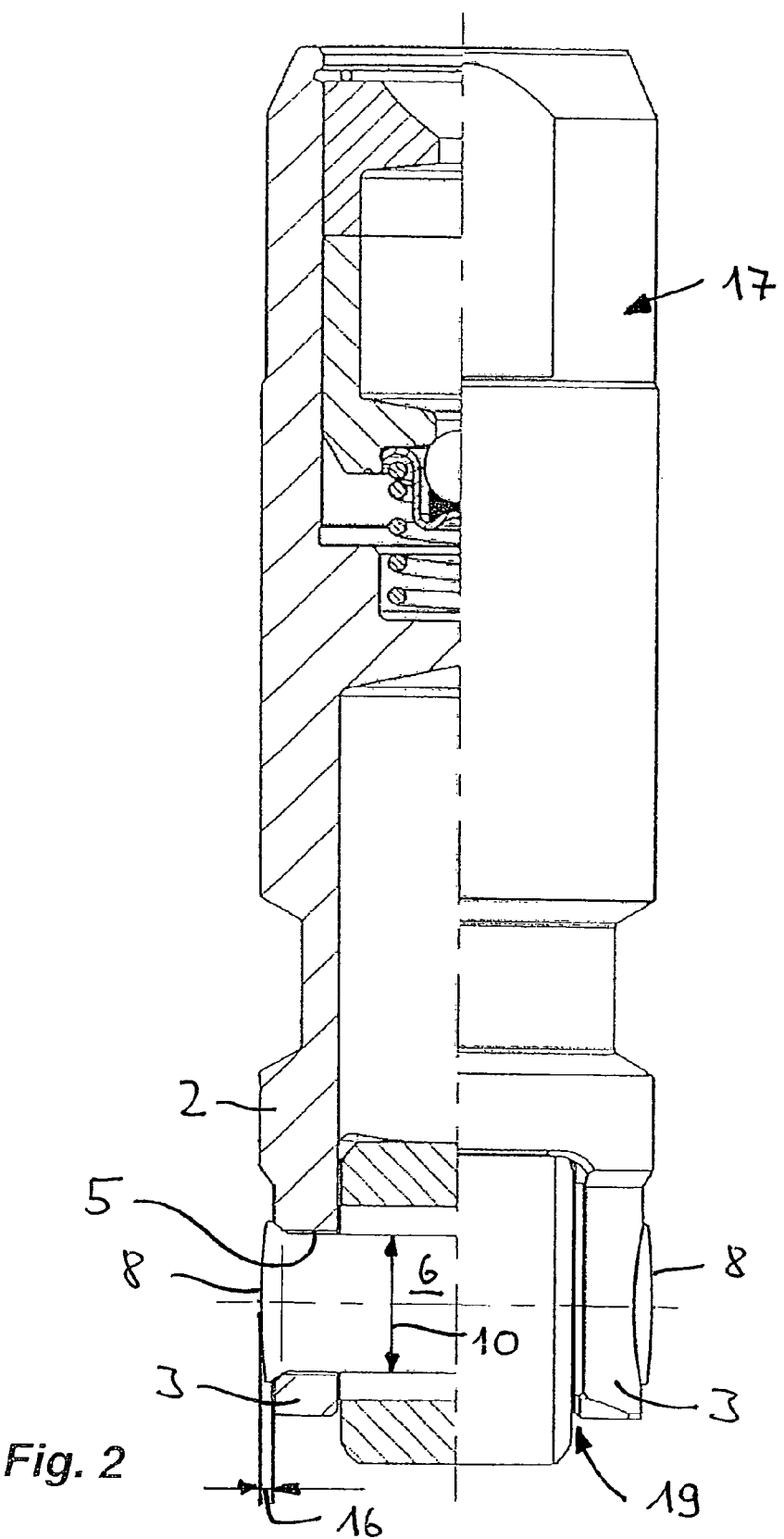
FIG. 2 shows a longitudinal semi-section of a lift transmitting component of the invention configured as a roller tappet for a gas exchange valve train.
Figure 3:
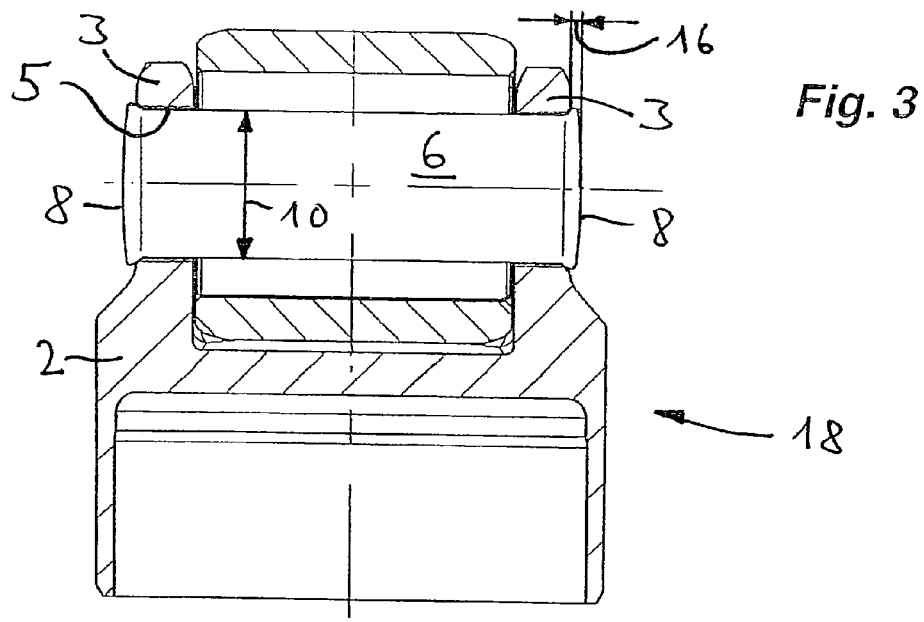
FIG. 3 shows a longitudinal section of a lift transmitting component of the invention configured as a pump tappet for a high pressure fuel pump.

Tests carried out by the applicant confirmed the basic suitability of this type of fixation of the bearing pin on highly loaded lift transmitting components of internal combustion engines. The tests were carried out both on a roller tappet, illustrated in FIG. 2 and designated in the following as a valve tappet 17 for a tappet push rod gas exchange valve train, and, as shown in FIG. 3, on a cam-actuated roller tappet, designated in the following as a pump tappet 18 for a high pressure fuel pump configured as a radial piston pump of an internal combustion engine with direct gasoline injection. For evaluating the test results, identical components comprising conventional, calked bearing pins were used as a reference.

Both the bearing pin 6 of the valve tappet 17 and the bearing pin 6 of the pump tappet 18 were made of a rolling bearing steel of the type 100Cr6 and core-hardened to a core hardness of about 60 HRC. The bearing pins 6 each had a diameter 10 of approximately 7.6 mm and, with the aim of achieving low joining stresses while accepting a minimal deformation of the housing 2, the adjusting lash of the bearing pins 6 relative to the respective reception bores 5 of the likewise hardened housings 2 of the valve tappet 17 and the pump tappet 18 was chosen such that no ratio of bearing contact area existed in the region of the non-widened diameter 10 of the bearing pins 6 relative to the reception bores 5. This was confirmed by deep-etching of the reception bores 5 that showed neither a bearing contact area ratio nor cracks in the housing. Moreover, no noteworthy breakaway torque of the bearing pins 6 was measurable in a torque test also carried out.

The length of the bearing pin 6 was dimensioned such that the projection length 16 of the front ends 8 beyond the housing 2 on both sides was 0.33 mm in the case of the valve tappet 17 and 1.0 mm in the case of the pump tappet 18 mm. For assuring a freedom of movement of the valve tappet 17 in its reception bore, the projection length 16 relative to the housing 2 that is likewise cylindrical in the region of the reception bore 5, is relatively small and refers to a plane of measurement identical to the longitudinal sectional plane (on left side in FIG. 2). In contrast, in the region of the reception bore 5, the pump tappet 18 comprises receding and partially flat side walls 3, so that in this case, the constant projection length 16 on the periphery of the bearing pin 6 relative to the side walls 3 could be made clearly larger without danger of collision with the reception bore of the pump tappet 18. Moreover, the bearing pin 6 of the pump tappet 18 was deliberately deformed such that the bearing pin 6 had perceptible axial lash in its reception bore 5.

The deformation of the mounted bearing pin 6 was performed on a hydraulic radial spot riveting machine with a flat riveting die 12 (FIG. 4) with a riveting force of about 25 KN and a riveting time of about 2 sec. on each end 8. It may be mentioned in this connection that, for the sake of better illustration, both the radial lash of the bearing pin 6 in the reception bore 5 and the radial widening of the front ends 8 are shown strongly exaggerated in FIGS. 1 to 3. In a measurement of the bearing pins 6 deformed by radial spot riveting it was determined that the widening of the front ends 8 relative to the diameter 10 of the bearing pins 6 was only about 0.1 mm. For this reason, it is also possible to make the chamfers 9 (FIG. 1) correspondingly small in the manner of an edge discontinuity.

The interference fit of the bearing pins 6 was determined on the basis of the static axial force that was required for pushing the bearing pins 6 out of the reception bores 5. The average axial force in the case of the pump tappet 18 was approximately 2700 N and was thus already at the same force level as the reference components with calked bearing pins. The average axial force in the case of the valve tappet 17, with approximately 3100 N, was even clearly higher than the average axial force of approximately 2100 N of the reference components.

In addition, pressing the bearing pin 6 out of the valve tappet 17 led to tearing-open of the reception bore 5, so that it was confirmed that a shearing-off of material of the radially widened ends 8 of the core-hardened and radially spot riveted bearing pin 6 under dynamic operational loading and, given the case, despite rotation, is not to be expected.

Finally, the circularity test on the valve tappet 17 performed before the axial force measurement confirmed that the bearing pin 6 connected only by positive engagement to the housing 2 by radial spot riveting does not lead to any or to any remarkable deformation of the housing 2 as a result of joining stresses in the region of the roller pocket 19 defined by the side walls 3, which roller pocket 19 with its open configuration, i.e. with the side walls 3 not connected to each other in peripheral direction, is particularly susceptible to deformation. The circularity test on the housing 2 was performed with an outer diameter gauge; all the tested valve tappets 17 passed the test as accepts or good parts.

To conclude, it may be pointed out that the test parameters given here for a better illustration of the present invention, i.e. particularly the sizes, the material and the hardness of the bearing pins as well as their radial lash in the associated reception bores and the riveting force and time, must be adapted to each particular case of use and are stated here only by way of example.

LIST OF REFERENCE NUMERALS

1 Lift transmitting component
2 Housing
3 Side wall
4 Roller
5 Reception bore
6 Bearing pin
7 Needle roller bearing
8 Front end of bearing pin
9 Chamfer
10 Diameter of bearing pin
11 Diameter of reception bore
12 Riveting die
13 Longitudinal axis of riveting die
14 Loop line
15 Central axis of circular cone
16 Projection length of bearing pin
17 Valve tappet
18 Pump tappet
19 Roller pocket

The invention claimed is:

1. A lift transmitting component for a gas exchange valve train or a fuel pump drive of an internal combustion engine, said lift transmitting component comprising a housing with a substantially configuration and a bearing pin fixed with axial lash in a reception bore of the housing and a roller rotatable about the bearing pin and optionally mounted on a rolling bearing, one or both from ends of the bearing pin being radially widened relative to the reception bore having a stepped configuration for connecting the bearing pin to the housing by positive engagement, wherein the bearing pin is core-hardened over an entire length with a core hardness of at least 58 HRC and the front ends of the bearing pin are widened in a core-hardened state by radial spot riveting.

2. A lift transmitting component of claim 1, wherein a non-widened diameter of the bearing pin is smaller than a diameter of the reception bore.

3. A lift transmitting component of claim 1, wherein the bearing pin is fixed with axial lash in the reception bore.

4. A lift transmitting component of claim 1, wherein the lift transmitting component is a roller tappet for a gas exchange valve train comprising a bottom camshaft.

5. A lift transmitting component of claim 1, wherein the lift transmitting component is a pump tappet for a high pressure fuel pump.

* * * * *